United States Patent

[11] 3,609,420

[72] Inventors: Junpei Inagaki, Yokohama-shi; Moriyoshi Sakamoto, Yokohama-shi; Tsuneo Nakakita, Kawasaki-shi; Yasuaki Kanda, Tokyo; Hiroyuki Kitamura, Yokohama-shi, all of Japan
[21] Appl. No.: 861,601
[22] Filed: Sept. 29, 1969
[45] Patented: Sept. 28, 1971
[73] Assignee: Tokyo Shibaura Electric Co., Ltd Kawasaki-shi, Japan
[32] Priority: Oct. 1, 1968, Oct. 1, 1968, Oct. 1, 1968, Oct. 1, 1968, Oct. 1, 1968
[33] Japan
[31] 43/70871, 43/70873, 43/70874, 43/70879 and 43/70880

[54] LIQUID-COOLED DYNAMOELECTRIC MACHINES
5 Claims, 4 Drawing Figs.

[52] U.S. Cl. .................................................. 310/54, 310/86
[51] Int. Cl. .................................................. H02k 9/19
[50] Field of Search .................................. 310/54, 57, 64, 65, 86, 168, 263, 68

[56] References Cited

UNITED STATES PATENTS

| | | | |
|---|---|---|---|
| 2,285,960 | 6/1942 | Fechheimer | 310/54 |
| 2,573,126 | 10/1951 | Andrus | 310/86 X |
| 3,229,130 | 1/1966 | Drouard | 310/54 |
| 3,309,547 | 3/1967 | Woodward, Jr. | 310/263 X |
| 2,987,637 | 6/1961 | Bertsche et al. | 310/54 |

FOREIGN PATENTS

| | | | |
|---|---|---|---|
| 283,308 | 10/1965 | Australia | 310/54 |
| 693,507 | 9/1964 | Canada | 310/86 |

Primary Examiner—D. F. Duggan
Attorney—Flynn & Frishauf

ABSTRACT: A liquid-cooled dynamoelectric machine wherein the rotor is enclosed by a liquid-tight nonmagnetic cylindrical shielding member and cooling liquid is sprayed directly upon high-temperature portions of the stator such as end turns of the armature winding.

3,609,420

3,609,420

LIQUID-COOLED DYNAMOELECTRIC MACHINES

This invention relates to a liquid-cooled dynamoelectric machine and more particularly to an improved liquid-cooled dynamoelectric machine wherein cooling liquid is sprayed directly upon high-temperature portions of the machine.

The prior art liquid-cooled dynamoelectric machine is constructed such that the cooling liquid is used to cool high-temperature portions of the machine while it is circulated through a circulating pipe contained in the machine so that the cooling efficiency of the cooling liquid is poor.

As is well known in the art, the rating of a dynamoelectric machine is limited by the temperature rise of the machine. For this reason, it is highly desirable to provide an efficient cooling means for a dynamoelectric machine of compact design.

One efficient method of cooling a dynamoelectric machine is to spray the cooling liquid directly upon high-temperature portions of the machine, such as end turns of a stator coil, for example. With this arrangement, however, the cooling liquid enters into the air gap between the stator and the rotor and is heated to an elevated temperature due to frictional loss. Further, it is necessary to construct all portions of the machine liquid proof. For this reason, this type of cooling has not been used.

Electric motors for certain applications, for example, driving motors of electric automobiles are required to be small size, lightweight and operable at extremely high speed. In order to improve the weight vs. output ratio to less than 1 kg./hp. like that of gasoline engines and to pass very large armature current to increase the torque to more than 200 percent of the rated torque when going up grades, it is highly desirable to provide an efficient cooling means.

It is an object of this invention to provide an improved liquid-cooled dynamoelectric machine in which high-temperature portions thereof can be directly cooled by cooling liquid.

Another object of this invention is to provide improved means which effectively shields the rotor and airgap against invasion of the cooling means.

SUMMARY OF THE INVENTION

According to this invention, the rotor of dynamoelectric machine is surrounded by a liquid-tight nonmagnetic cylindrical shielding member and cooling liquid is sprayed directly upon high-temperature portions of the stator, such as end turns of the armature winding. In one embodiment, such nonmagnetic shielding members are provided between respective end plates of the stator core and stationary end members of the machine. In a modified embodiment the shielding member is a single cylinder axially extending through the airgap with its both ends connected to end members of the machine. The cylindrical shielding member is made of laminated glass cloth impregnated with epoxide resin. The shielding member may be opened at its lower end to permit it to urge against the inner wall of the stator core by its resiliency. Alternatively, the shielding member may be cemented to the inner surface of the stator core by a suitable bonding agent.

The invention can be more fully understood from the following detailed description taken in conjunction with the accompanying drawings, in which.

Figure 1:
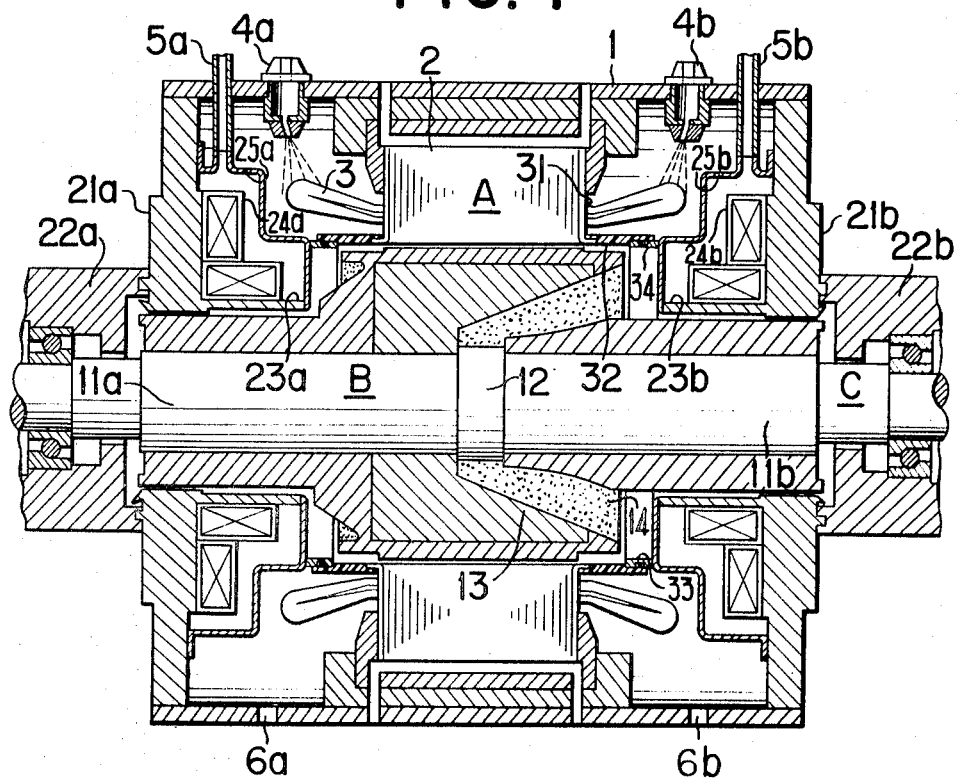
FIG. 1 is a longitudinal sectional view of an electric motor embodying this invention.

The accompanying drawings illustrate the application of this invention for an electric motor having a rotor of the comb type. The motor illustrated comprises a stator A and a rotor B rotatably supported by bearings C. The stator A is of the conventional construction comprising a cylindrical frame 1, an armature core 2 secured to the inner surface of frame 1 and an armature winding 3 contained in the slots of the armature core and treated with liquid-tight varnish. On the upper wall of the frame are provided nozzles 4a and 4b for spraying cooling liquid, for example oil, onto high-temperature portions of the motor which are illustrated as end turns of the armature winding 3, and exit openings 6a and 6b for draining spent cooling liquid are provided through the lower wall of the cylindrical frame 1.

While the invention is not limited to any construction of the rotor, the rotor illustrated is of the comb-shaped pole type and comprises a pair of magnetic coaxial shafts 11a and 11b which are coupled together by means of an intermediate nonmagnetic shaft 12. Substantially cylindrical magnetic sections each having comb-type magnetic pole pieces 13 are secured on shafts 11a and 11b with their pole pieces 13 intermeshed as is well known in the art. Gaps between intermeshing pole pieces are filled with nonmagnetic material 14 such as resin or cast aluminum.

Outer ends of shafts 11a and 11b are journaled by suitable bearings mounted in bearing brackets 22a and 22b secured to end brackets 21a and 21b of the motor. End brackets 21a and 21b are provided with inwardly projecting cylindrical members 23a and 23b around which are wound filled coils 24a and 24b enclosed by housings 25a and 25b. Cooling liquid is circulated around field coils through conduits 5a and 5b extending through the cylindrical frame 1.

Figure 2:
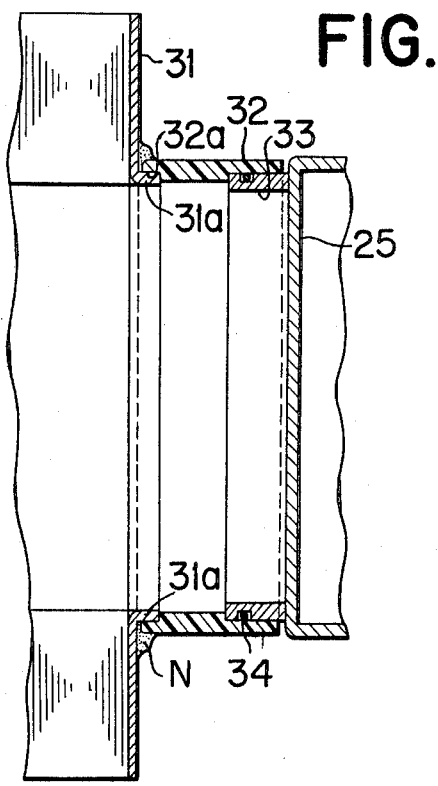
FIG. 2 is an enlarged longitudinal sectional view of a portion of the motor shown in FIG. 1.

As shown in FIGS. 1 and 2, each end plate 31 of the laminated armature core 2 is provided with an axially projecting annular flange 31a around its inner periphery to fit in one end of a nonmagnetic cylindrical shielding member 32. The shielding member is made of a laminated cylinder of an epoxide-glass sheet, for example. A shoulder 32a is formed in one end to fit over the flange 31a of the end plate. The joint between the end plate 31 and the shielding member 32 is sealed in a liquid-tight manner by means of a suitable sealing compound N. The opposite end of the shielding member 32 is connected to a stationary supporting ring 33 secured to an end member of the motor, for example, housing 25b enclosing field coil 24b. An O-ring 34 is interposed between shielding member 32 and stationary supporting ring 33 to provide a liquid-tight connection.

In operation, field coils 24a and 24b are cooled by the cooling liquid circulating through housings 25a and 25b via conduits 5a and 5b. Cooling liquid ejected from nozzles 4a and 4b is sprayed directly upon end turns of the armature winding 3 to effectively cool the same. Cooling liquid then flows down along opposite sides of the armature winding. The cooling liquid collected in the bottom of the frame 1 is discharged through openings 6a and 6b.

The connection between the end plate and the shielding member may take various forms. For example, an annular groove may be formed on one sidewall of the end plate to receive one end of the shielding member.

Figure 3:
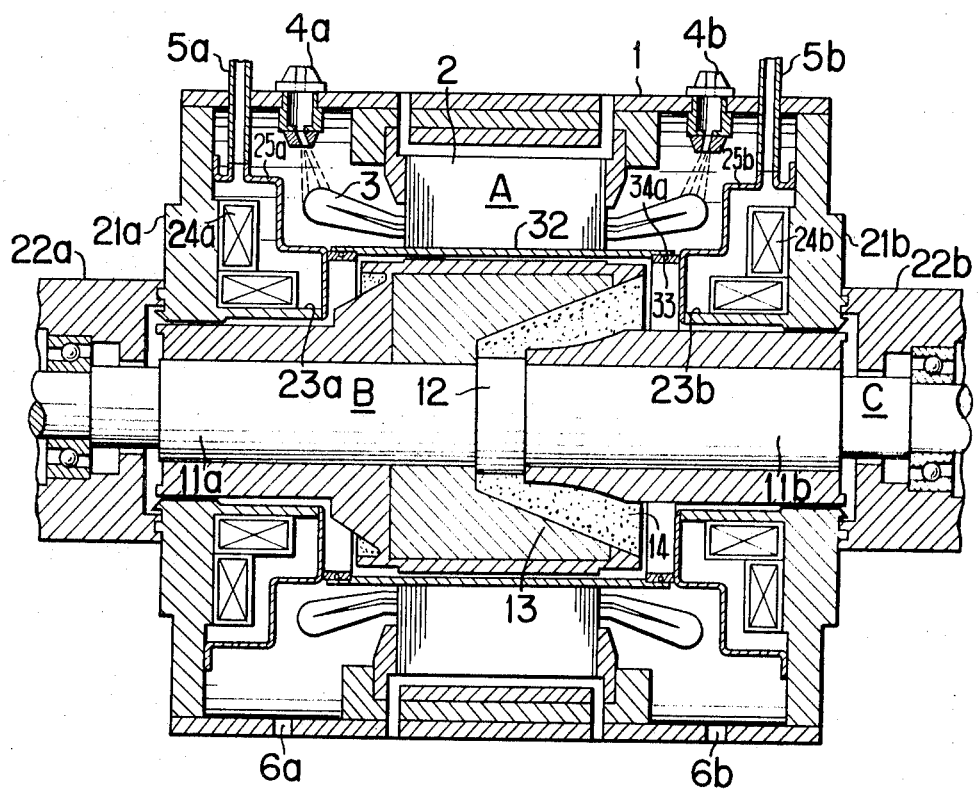
FIG. 3 is a view similar to FIG. 1 but employing a single shielding member.
Figure 4:
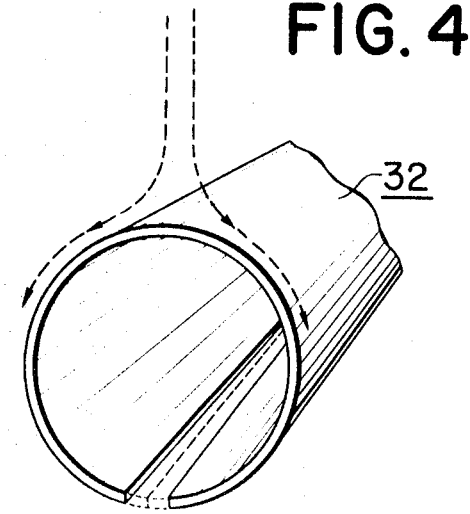
FIG. 4 is a perspective view of the nonmagnetic cylindrical shielding member employed in the embodiment shown in FIG. 3.

According to a modified embodiment shown in FIGS. 3 and 4, the nonmagnetic cylindrical shielding member 32 is constructed to have sufficient length to axially extend between field coil housings 25a and 25b. The central portion of the shielding member 32 is tightly fitted around the inner periphery of the armature core 2 while its opposite ends are fitted over supporting rings 33 secured to field coil housings 25a and 25b through O-rings 34a. Again the shielding member 32 is made of an epoxide-glass lamination and may be opened or closed as shown by dotted lines at its lower end as shown in FIG. 4. When the lower end is left open it is possible to firmly hold the sealing member 32 against the inner periphery of the armature core 2 by resilient force. If desired the sealing member 32 may be cemented to the inner periphery of the armature core 2 by means of a suitable bonding agent. Since the shielding member has sufficiently large mechanical strength it is possible to reduce the size of wedges which are used to hold armature winding 3 against radial movement. In some cases, it is possible to completely eliminate such wedges.

Thus, it will be seen that the invention provides a liquid-cooled dynamoelectric machine wherein high temperature portions such as the armature winding thereof are efficiently cooled by cooling liquid directly sprayed thereon. Moreover, as the cylindrical shield prevents the cooling liquid from entering into the airgap and the rotor to decrease friction loss, thus preventing temperature rise of the rotor. In addition, as the cylindrical shield member is made of laminated glass cloths impregnated with cured epoxide resin, it has sufficient mechanical strength, is easy to assemble and dismount, and is not permeable to the cooling liquid.

What we claim is:

1. A liquid-cooled dynamoelectric machine comprising:

a stator carrying an armature winding;

a rotor, an airgap being formed between said rotor and said stator;

a nonmagnetic generally cylindrical shielding member at least partially surrounding said rotor and extending through said airgap between said stator and rotor, the opposite ends of said shielding member being connected to stationary members of said machine in a liquid-tight manner to seal said rotor from said cooling liquid, said shielding member including a cutout portion longitudinally extending along the whole length thereof whereby said shielding member is urged against the inner periphery of the stator member; and means to spray cooling liquid directly upon high-temperature portions of the armature winding of said stator.

2. A dynamoelectric machine according to claim 1 wherein said nonmagnetic shielding member is comprised of glass cloth impregnated with cured resin.

3. A dynamoelectric machine according to claim 1 wherein said armature winding has end turns extending beyond the stator core and said cooling liquid is sprayed directly upon said extending end turns.

4. A dynamoelectric machine according to claim 3 wherein said machine includes two stationary end members at respective ends thereof and comprising two nonmagnetic shielding members, each being connected between opposite sides of said stator and respective stationary end members of said machine.

5. A dynamoelectric machine according to claim 1 wherein said nonmagnetic shielding member is cemented to the inner periphery of the stator member by means of a bonding agent.